Patented Apr. 27, 1937

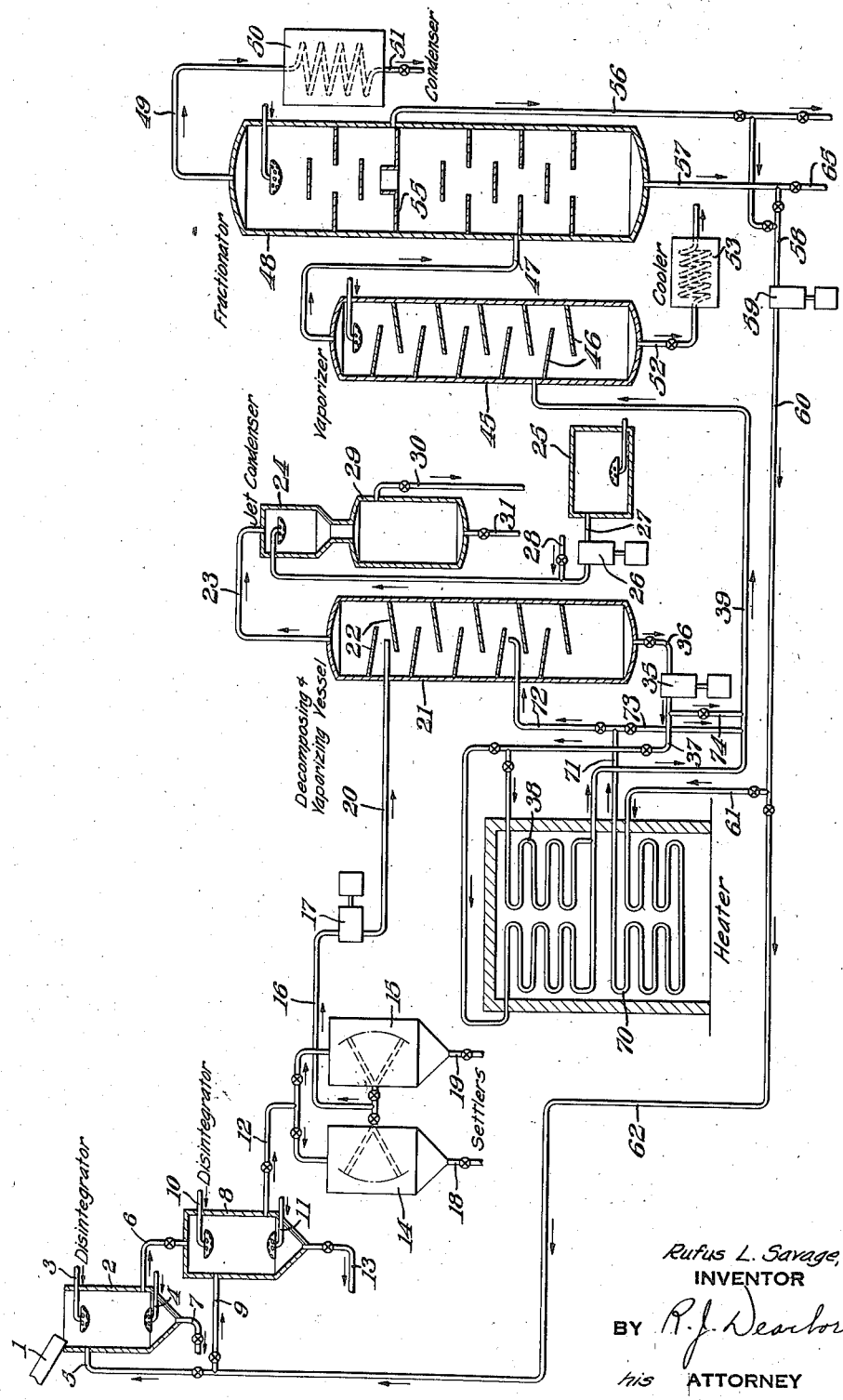

2,078,882

UNITED STATES PATENT OFFICE 2,078,882

METHOD FOR THE PREPARATION OF FUEL OIL

Rufus L. Savage, Jr., Port Arthur, Tex., assignor to The Texas Company, New York, N. Y., a corporation of Delaware Application June 13, 1934, Serial No. 730,379

12 Claims. (Cl. 196—148)

The present invention relates to a method of preparing heavy fuel oil from acid-oil sludge derived from the treatment of mineral oils with sulfuric acid.

The invention primarily contemplates a method of preparing fuel oil from acid-oil sludge, resulting from the sulfuric acid treatment of mineral lubricating and light oils, that is ordinarily considered a by-product of little commercial value, which consists essentially in separating out the oil-soluble portion of the sludge and subjecting it to a purifying treatment, in accordance with the invention, to produce a relatively heavy fuel oil base of satisfactory merchantable grade.

Normally the acid-oil sludge resulting from the sulfuric acid treatment of mineral oils consists of a portion of tarry or pitch-like substance which is insoluble and immiscible in either oil or water, a portion of oily substance which is soluble in a mineral oil diluent, and a portion of dilute sulfuric acid, and includes a relatively small amount of sulfonic acids and complex sulfur compounds.

The present invention is a specific improvement on the process disclosed in co-pending application Serial No. 633,228, Carl E. Lauer et al., filed September 15, 1932. In the process disclosed in that application an acid-oil sludge is agitated with steam in the presence of water and a light diluent oil, such as gas oil. In the case of sludges from the treatment of petroleum light oils, it will be obvious to those skilled in the art that the above described separation may be simplified. As well known in the art, the oil-soluble portion of the petroleum light oil sludges may be separated from the main part of the unconsumed acid by washing with water and without the use of any diluent oil. The acidic oil thus derived may then be treated in accordance with the invention. After settling, the oil-soluble portion of the sludge, containing diluent light oil, is mildly heated to thereby decompose and volatilize the contained acidic compounds which are removed, and the deacidified oil is then subjected to distillation to remove the light oil and produce a residue of merchantable fuel oil or fuel oil base. The heating to decompose acidic compounds is effected preferably by introducing the mixture of diluent and acid sludge into the upper part of a chamber where it comes into contact with an oil heated to a high temperature of about 750° F. or over. The deacidified sludge containing diluent light oil is then preferably passed through a tubular heater and heated to about 750° F., and a part of this heated oil is introduced into the chamber to serve as the hot oil for contacting with the acid sludge.

According to the present improvement, a portion of the light oil diluent uncontaminated with sludge is passed through the heater and introduced into the chamber to heat the acid sludge therein. By operating in this manner higher temperatures may safely be employed in the oil-heating step and the danger of coke deposition in the heating tubes is substantially eliminated. This prolongs the life of the equipment and enables longer runs to be made. The clean light oil is more refractory to decomposition and coke formation than the deacidified sludge, and may be heated to a higher temperature without depositing coke in the tubes. For example, this light oil may be heated to a temperature of 800° F. or higher, but, since it is preferably not maintained at such temperature for a substantial period of time, little cracking occurs.

In order to more fully describe the invention, reference is now made to the single figure of the accompanying drawing illustrating in diagrammatic elevation a preferred form of apparatus for carrying on the invention.

The numeral 1 is applied to a chute through which acid-oil sludge may be delivered, from a source not shown, into a disintegrating or separation tank 2, which has a water connection 3, a steam connection 4, and a diluent oil connection 5. When a sufficient amount of the sludge has been delivered into the tank 2, diluent oil and water may be delivered into the tank for the purpose of thinning the sludge, by diluting the oil-soluble portion and the acid portion present, to such an extent that a separation of the acid, oily portion and tarry portion may also be effected. Following the addition of the diluent oil and water, steam is sprayed into the lower portion of the tank and a vigorous agitation and warming of the mass of sludge and diluent is carried on until a fairly thorough disintegration of the mass is effected and the separable portions are then separated out by settling. In this step, three layers will ordinarily be formed, which consist of weak acid, the tarry oil-insoluble portion, and the dilute oil-soluble portion. The upper layers of dilute oily portion and tarry portion may then be drawn off into a second tank 8, through a line 6, and the remaining weak acid may be drawn off to a recovery system through a line 7.

The tank 8 has a diluent oil connection 9, a water connection 10, and a steam connection 11. In this tank a repetition of the disintegrating and settling of the sludge, described as being carried on in tank 2, is effected and the resulting oil-soluble portion and tarry portion may be drawn off into settling tanks 14 or 15 while the dilute acid may be withdrawn to a recovery system through a line 13.

The oil-soluble and the oil-insoluble portions of the sludge are preferably delivered alternately into settling tanks 14 and 15, in which a separation of the two portions is effected. By employing two settlers, it is possible to carry on separation in one of the settlers while the other is being drained and refilled, thus making available a continuous supply of sludge for the process. The oil-soluble portion is preferably withdrawn from one of the settlers at a time through a line 16 by a pump 17, while the tarry portion may be drained off through a line 18 or a line 19.

The oil-soluble portion withdrawn by a pump 17 may contain slight amounts of sulfuric acid, sulfonic acids, and other acidic sulfur compounds. This portion is preferably delivered through a line 20 to the upper portion of a vessel 21 which contains a series of baffles 22. As it moves downwardly through the vessel over the baffles 22, it is brought into contact with a heat-carrying medium, to be hereinafter described, by which it is rapidly heated to a temperature at which the water content vaporizes and the acidic sulfur compounds are decomposed and vaporized. This vaporization and decomposition readily takes place under the temperatures existing in the vessel which may vary somewhat over a range of about 380° to 420° F. at about atmospheric pressure.

In the novel manner of this invention, the heating of the acid-oil sludge to a point of decomposition and volatilization of the acidic sulfur compounds is effected with ease and economy, with the result that the life of the equipment is greatly prolonged and the corrosive effect of the decomposition products is substantially avoided.

The heat-carrying medium, consisting of a portion of a clean distillate of the nature of clean gas oil, is injected into the vessel 21 at a point preferably somewhat lower than the entrance of the untreated oil portion, and preferably at a temperature of about 800° F. The heat imparted by the hot oil effects the desired decomposition of the corrosive sulfur compounds, converting them into vaporous form. That portion of the oil which might have been vaporized in the heating step is cooled and condensed by its contact with the cooler sludge, and falls to the bottom of the vessel 21, together with the oil content of the sludge which has now been substantially freed from corrosive compounds.

The vapors evolved from the vessel 21 by the heat interchange between the cool acid-oil sludge and the hot gas oil are delivered overhead through a line 23, while the unvaporized oil portion, which has been freed of water and acidic sulfur compounds, together with the gas oil, is accumulated in the lower portion of the tower 21. The pressure in the vessel 21 is preferably maintained at about 15 to 20 pounds per square inch gauge, but pressures below or above this may be used if desired.

The vapors of decomposed acidic sulfur compounds, occasionally containing a small proportion of light oil such as naphtha vapor, are ejected from the vessel 21 by a jet condenser 24 by which they are brought into contact with a neutralizing alkaline material which is supplied from a tank 25 by a pump 26 through a line 27, together with cooling water which may be supplied through a line 28. The water and naphtha from the jet condenser 24 are dropped into a separator 29 which is provided with an oil or vapor outlet line 30 and a water drain line 31. Preferably milk of lime is employed as the alkaline material and in such quantity that a substantially neutral solution results. However, other alkaline materials, such as caustic soda, soda ash and waste alkaline solutions, may also be used.

A pump 35 withdraws purified dilute oil-sludge from the lower portion of the vessel 21 through a line 36 and delivers it through a line 37 into a suitable heater 38 where the temperature is raised to about 500 or 600° F., or higher if necessary, to flash off contained lighter diluent oil to a desirable extent to thereby bring the remaining fuel oil or base within specification limits. The thus heated oil is delivered through a line 39 into a vaporizing vessel 45 which contains a series of baffles 46.

It may thus be seen that the heavier portions of the sludge oil, in mixture with the light portions need be heated only enough to flash off the contained light diluent oil.

In the vessel 45, a diluent oil, which as previously mentioned may be of the nature of gas oil, is substantially vaporized from the associated heavier oil resulting from the sludge which remains as a purified residue, and constitutes a homogeneous fuel oil or base which may be blended with other petroleum fractions.

The vapors evolved in the vessel 45 consist mostly of the vapors of the diluent gas oil, but may include a small amount of lighter hydrocarbons, which may be of the nature of naphtha, together with small portions of heavier constituents and uncondensable gas produced in the heating step. By applying reflux cooling to the upper portion of the vessel, it is possible to cleanse the vapors therein of the heavier constituents, so that the vapors may emerge free of this heavy fraction. Any cooling medium may be used as a reflux, although it is preferable to use a gas oil of the nature of that vaporized in the vessel 45.

The vapors are conducted overhead from the vessel 45 through a line 47 to a fractionator 48 in which the gas oil fraction is condensed, and the naphtha, if there be any, and gases are withdrawn overhead through a line 49 to a condenser 50. It may also be desirable to apply reflux cooling to the upper portion of the fractionator 48 to cleanse the vapors before they are removed from the fractionator, in which case it may be preferable to return a portion of the naphtha condensed in the condenser 50, or a portion of the light gas oil may be used.

The remaining unvaporized material in the vessel 45, which is the purified fuel oil or base material, is withdrawn through a line 52 through a cooler 53 to storage.

The condensate from the vessel 48, which is the recovered diluent oil, is withdrawn through a line 57, a portion of which may be recycled to the disintegrators 2 and 8 through lines 60 and 62 and another portion may be diverted through line 61 to serve as a heat-carrying medium as will be more fully described presently. A release line 65 is provided for releasing surplus portions of the diluent oil from the system. Provision is made by means of the pan-tray 55 and the draw-off pipe 56 for removing clean recycle oil or gas oil from a point somewhere above the bottom of vessel 48.

That portion of the clean oil which may be diverted through the line 61 is passed through to a coil heater 70 and transferred through pipes 71 and 72 into the lower portion of the decomposing and vaporizing vessel 21 where, in open contact with the acid-oil sludge entering above, it provides the heat necessary to accomplish the decomposition and vaporization of the undesirable acidic compounds present in the sludge oil.

It may be found desirable at times to heat somewhat more clean oil in heater 70 than is necessary for use in heating the sludge in the vessel 21, and the surplus may be diverted through a line 73 to join the cooler purified sludge oil en route from the heater 38 to the flashing vessel 45 to aid in vaporizing the diluent oil content; or, in an alternative mode of operation, the clean oil may be heated to a somewhat higher temperature without increasing its volume.

In still another mode the heater 38 may be by-passed entirely by the purified sludge oil and the purified oil be transferred direct from the base of the vessel 21 through a line 74 into the line 39 where it may be further heated by direct contact with a surplus portion of more highly heated clean oil from the heater 70, and the hot mixture may be flashed in the vessel 45. Thus the arrangement for heating the untreated acid-oil sludge in the vessel 21 to decompose and vaporize the acidic impurities, and for ultimately raising the temperature of the purified oil sludge to vaporize the contained gas oil, is very flexible.

I claim:

1. The process of treating an acid-oil sludge containing objectionable acidic sulfur compounds which comprises delivering the sludge into a heating chamber, passing a hot refractory diluent oil into the chamber in direct contact with the sludge to heat the same and effect decomposition and vaporization of the acidic sulful compounds, the heating being controlled to avoid any substantial carbonization or cracking of the said sludge, withdrawing the resulting vapors, collecting the purified oil sludge together with the refractory diluent oil, then separating the refractory diluent oil by fractional distillation while removing the purified oil sludge as a residual product of merchantable fuel oil grade, and heating the refractory diluent oil and introducing it into the chamber as the said hot oil to effect heating and decomposition of the acidic sulfur compounds therein.

2. The process of treating an acid-oil sludge containing objectionable acidic sulfur compounds and a refractory diluent oil which comprises delivering the sludge into a heating chamber, passing a hot refractory diluent oil into the chamber in direct contact with the sludge to heat the same and effect decomposition and vaporization of the acidic sulfur compounds, the heating being controlled to avoid any substantial carbonization or cracking of the said sludge, withdrawing the resulting vapors, collecting the purified oil sludge together with the refractory diluent oil, then separating the refractory diluent oil by fractional distillation while removing the purified oil sludge as a residual product of merchantable fuel oil grade, and heating a portion of the refractory diluent oil and introducing it into the chamber as the said hot oil to effect heating and decomposition of the acidic sulfur compounds therein.

3. The process of treating an acid-oil sludge containing objectionable acidic sulfur compounds and a refractory diluent oil which comprises delivering the sludge into a heating chamber, passing a hot refractory diluent oil into the chamber in direct contact with the sludge to heat the same and effect decomposition and vaporization of the acidic sulfur compounds, withdrawing the resulting vapors, collecting the purified oil sludge together with the refractory diluent oil, then further heating the mixture by admixing it with hot refractory diluent oil, and vaporizing the refractory diluent oil therefrom by flashing the mixture into a distillation zone leaving the purified oil sludge as a residual product of merchantable fuel oil grade.

4. The process of treating an acid-oil sludge containing objectionable acidic sulfur compounds and a refractory diluent oil which comprises delivering the sludge into a heating chamber, passing a hot refractory diluent oil into the chamber in direct contact with the sludge to heat the same and effect decomposition and vaporization of the acidic sulfur compounds, withdrawing the resulting vapors, collecting the purified oil sludge together with the refractory diluent oil, then heating the mixture in a coil to a temperature below that at which coke begins to form in the coil, and further heating the mixture by admixing it with hot refractory diluent oil, and vaporizing the refractory diluent oil therefrom by flashing the mixture into a distillation zone leaving the purified oil sludge as a residual product of merchantable fuel oil grade.

5. The process of treating an acid-oil sludge containing objectionable acidic sulfur compounds and a refractory diluent oil which comprises delivering the sludge into the upper part of a heating chamber, introducing a hot oil into the lower portion of the chamber and permitting a portion at least of the hot oil to vaporize therein, effecting contact between the hot vapors and downflowing sludge whereby the latter is heated and the acidic compounds are decomposed and vaporized and the hot oil vapors are substantially condensed, the heating being controlled to avoid any substantial carbonization or cracking of the said sludge, withdrawing the resulting vapors, collecting the purified oil sludge containing refractory diluent oil, separating the refractory oil therefrom by fractional distillation leaving the purified oil sludge as a residual product of merchantable fuel oil grade, collecting the refractory oil, and heating a portion thereof in a coil and introducing it into the chamber as the said hot oil to effect heating and decomposition of the acidic compounds therein.

6. The method according to claim 5 in which the refractory diluent oil is heated prior to introduction into the chamber to a temperature of the order of about 800° F.

7. The method according to claim 5 in which the oil sludge is heated in the chamber to a temperature of about 380–420° F.

8. The method according to claim 1 in which the refractory diluent oil is heated prior to introduction into the chamber to a temperature of the order of about 800° F.

9. The method according to claim 1 in which the oil sludge is heated in the chamber to a temperature of about 380–420° F.

10. The process of treating an acid-oil sludge containing objectionable acidic sulfur compounds which comprises separating out the oil-soluble fraction of the sludge, delivering said fraction into a heating chamber, passing a hot refractory diluent oil into the chamber in direct contact with the said fraction to heat the same and effect decomposition and vaporization of the acidic sulfur compounds, the heating being controlled to avoid any substantial carbonization or cracking of the said sludge, withdrawing the resulting vapors, collecting the purified fraction together with the refractory oil, then separating the refractory oil by fractional distillation while removing the purified fraction as a residual product of merchantable fuel oil grade, and heating the refractory oil and introducing it into the chamber as the said hot oil to effect heating and decomposition of the acidic sulfur compounds therein.

11. The process of treating an acid-oil sludge containing objectionable acidic sulfur compounds which comprises separating out the oil-soluble fraction of the sludge, delivering said fraction into a heating chamber, passing a hot refractory diluent oil into the chamber in direct contact with the said fraction to heat the same and effect decomposition and vaporization of the acidic sulfur compounds, withdrawing the resulting vapors, collecting the purified fraction together with the refractory diluent oil, then further heating the mixture by admixing it with hot refractory diluent oil and vaporizing the refractory diluent oil therefrom by flashing the mixture into a distillation zone, leaving the purified fraction as a residual product of merchantable fuel oil grade.

12. The process of treating acid sludge which comprises admixing sludge with water and a diluent oil, allowing the sludge to separate into an upper acid-oil layer, a middle sludge layer containing oil insoluble carbonaceous material and a bottom aqueous acid layer, separating the top acid-oil layer, passing the said acid-oil layer into a heating chamber, introducing a hot refractory diluent oil into the chamber in direct contact with the said acid-oil layer to heat the same and effect decomposition and vaporization of acidic sulfur compounds therein, the heating being controlled to avoid any substantial carbonization or cracking of the said sludge, withdrawing the resulting vapors, collecting the purified layer together with the refractory diluent oil, then separating the refractory diluent oil by fractional distillation while removing the purified layer as a residual product of merchantable fuel oil grade, and heating the separated refractory diluent oil and introducing it into the chamber as the said hot oil.

RUFUS L. SAVAGE, Jr.